Figure 1:
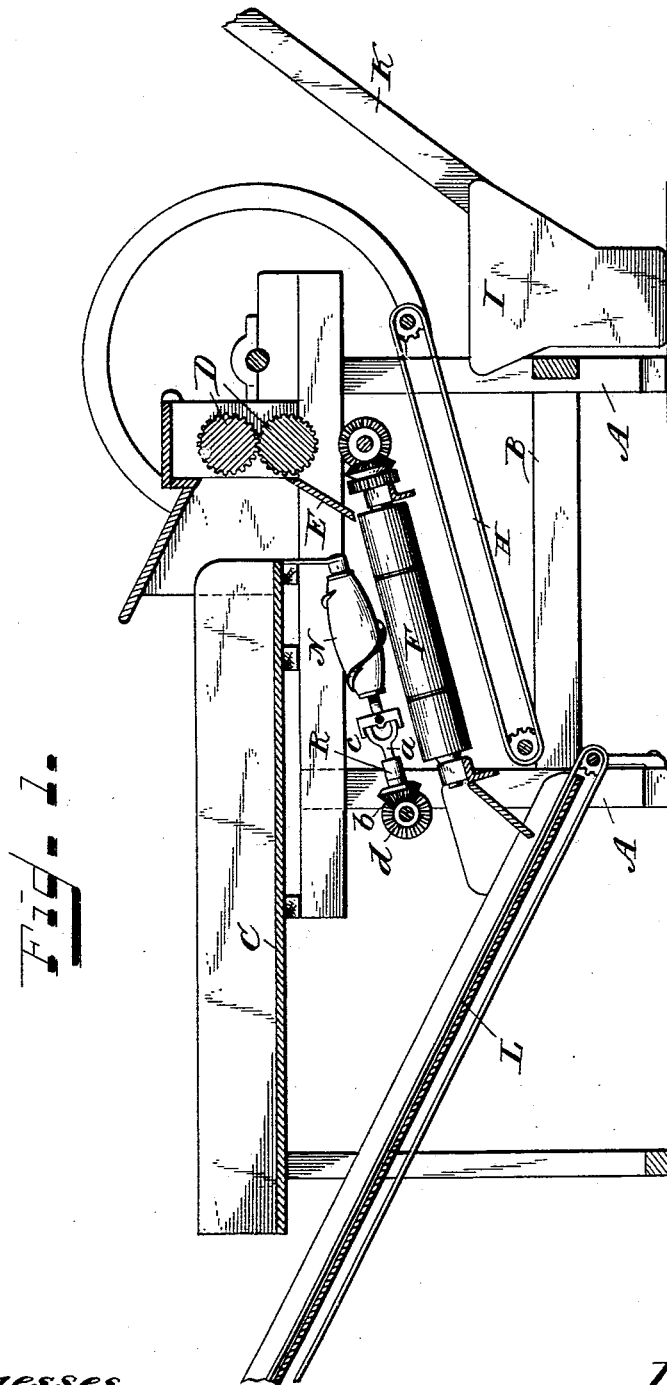

(No Model.)

2 Sheets—Sheet 1.

J. J. WOODMAN.
CORN HUSKING MACHINE.

No. 573,500.

Patented Dec. 22, 1896.

Witnesses.
J. Thomson Cross
Harvey G. Edwards

Inventor
John J. Woodman
by Stem & Allen
Attorneys.

(No Model.) 2 Sheets—Sheet 2.
J. J. WOODMAN.
CORN HUSKING MACHINE.
No. 573,500. Patented Dec. 22, 1896.
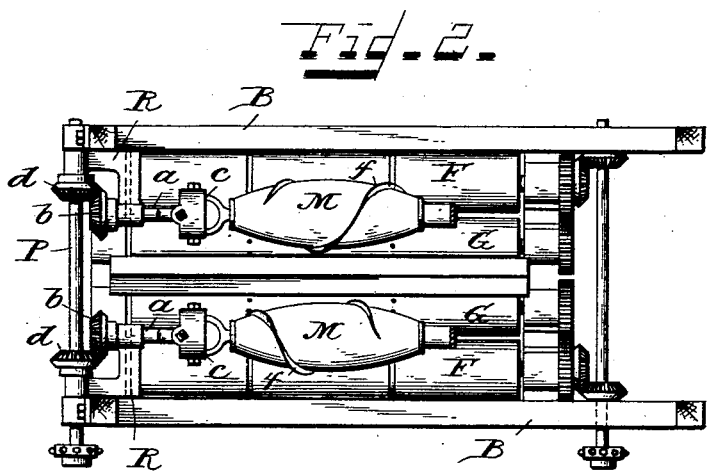
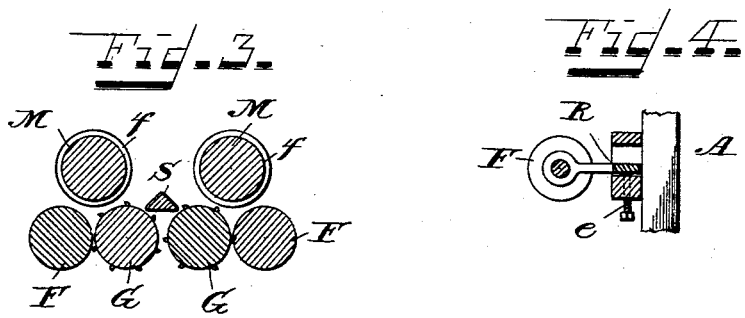
Witnesses.
J. Thomson Cross
Harvey G. Edwards
Inventor.
John J. Woodman
by Stew Allen
Attorneys.

UNITED STATES PATENT OFFICE.

JOHN J. WOODMAN, OF SPRINGFIELD, OHIO, ASSIGNOR TO THE E. W. ROSS COMPANY, OF SAME PLACE.

CORN-HUSKING MACHINE.

SPECIFICATION forming part of Letters Patent No. 573,500, dated December 22, 1896.

Application filed May 20, 1895. Serial No. 549,920. (No model.)

*To all whom it may concern:*

Be it known that I, JOHN J. WOODMAN, a citizen of the United States, residing at Springfield, in the county of Clark and State of Ohio, have invented certain new and useful Improvements in Corn-Husking Machines, of which the following is a full, clear, and exact description, reference being had to the accompanying drawings, which form a part of this specification.

My invention relates to improvements in machines for husking corn in which the ear of corn is removed from the stalk and the husks stripped therefrom by the operation of the machine; and it consists more particularly of a certain novel construction and arrangement of mechanism for revolving the ears of corn and keeping them in contact with the husking-rollers, a construction which will be hereinafter more particularly pointed out and claimed.

In machines of the class under consideration nipping-rollers are usually provided to jerk off the ear of corn from the stalk and allow the ear to drop down on inclined husking-rollers, which are usually a pair of rollers revolving toward each other, one of the rollers being provided with pins, which pins grasp the husks and tear them from the corn. In order that the husks may be grasped by these rollers on all sides, it has been usual to provide some means for revolving the ear of corn while in contact with the husking-rollers. The means heretofore in use has consisted of a roller journaled transversely of the husking-rollers and provided with a worm to cause the ears of corn to turn and keep them in contact with the husking-rollers. This arrangement, however, is not satisfactory in its operation. The corn is often not turned completely, and it is apt to slide by these transverse rollers too rapidly. The main feature of my invention consists in the substitution for these transverse rollers of revolving rollers journaled longitudinally of the husking-rollers, which longitudinal rollers are constructed and operated in such manner that they can properly act upon the ears of corn of all the varying sizes.

In the drawings, Figure 1 is a sectional side elevation of my improved machine. Fig. 2 is a top plan view of the husking mechanism, the other portions of the machine being removed and the point of view being at right angles to the plane of the inclined husking-rollers. Fig. 3 is a central cross-section of the husking and ear-revolving rollers. Fig. 4 is a detail view, in cross-section, of the L-shaped plate which supports one end of the ear-revolving rollers.

The operating mechanism of the machine is supported in a suitable framework consisting of standards A A and cross and side pieces B B.

C is a table upon which the stalks of corn are placed, where they are fed to the nipping-rollers D D. The stalks pass through these rollers, and the ears of corn slide down the plate E upon the husking-rollers F G. These husking-rollers are journaled in an inclined position in suitable journal-boxes attached to the framework, and in the machine I have illustrated I show two pairs of these husking-rollers, although of course it will be understood that my invention is applicable to machines having only one pair or more than two pairs of such rollers. These husking-rollers are driven by gearing in any of the well-known ways, so that they shall revolve toward each other, one of each pair of rollers being provided with pins and the other being grooved to receive these pins, which grasp and tear off the corn-husks, the husks falling upon an apron H, whence they are carried into a hopper I and removed by the elevator K, the corn when husked dropping out upon the elevator L, whence it is removed from the machine. These various aprons and elevators, together with the nipping and corn-husking rollers, are provided with suitable gearing, so that the machinery can all be driven by steam-power or by hand, as the case may be. The mechanism for driving these various parts forming no part of my invention I have not shown same.

M M are the ear-revolving rollers, constructed of any suitable material, either wood or metal, as the case may be. The spindles of these rollers on the inner end are supported in hangers N, which are secured to one of the cross-bars of the framework. The spindles at the other ends of these rollers are connected with the stub-shafts $a\ a$ of the beveled gear-wheels $b\ b$ by ordinary gimbal or knuckle joints $c\ c$.

P is a driving-shaft, upon which are mounted the beveled gears $d\ d$, meshing with the gears $b\ b$, and by means of which the rollers M M are rotated.

R R are angle-plates provided with collars at each end, one end of each of these collars being supported loosely on the driving-shaft P and the other ends supporting the stub-axles $a\ a$ of the gears $b\ b$. Each of these plates R is supported in a slot cut in the framework, as shown in Fig. 4, the slot being wide enough to allow considerable play and the amount of play being limited and regulated by the set-screw $e$, which bears against the under surface of the plate. From this method of construction with the gimbal-joint connection between the rollers M M and the driving mechanism it will be evident that the rollers M M will be free to raise up to allow the various-sized ears of corn to pass thereunder.

The ear-rotating rollers M M are each provided with a spiral flange or worm $f$, while the rollers themselves are egg-shaped or considerably narrower at each end than at the middle. This shape of roller allows any-sized ear to pass thereunder, whether big or little, and the spiral flange causes the ear to rotate and holds it in close contact with the husking-rollers. As the ear reaches the central portion of the roller it rises and allows the ear to pass thereunder, whence it is delivered out of the machine, as already set forth, when all the husks have been removed.

As I have already said, I have illustrated my improvements in connection with a machine provided with two pairs of husking-rollers separated by the block or partition S. It will of course be understood, however, that the number of pairs of husking-rollers will make no difference in the application of my invention thereto.

Having thus described my invention, what I claim, and desire to secure by Letters Patent, is—

1. In a corn-husking machine, the combination with the husking-rollers, of roller mechanism journaled parallel therewith to rotate the corn, driving-gear therefor, and knuckle-joint between said roller and driving-gear whereby play may be given said roller to allow the ears of corn to pass thereunder substantially as shown and described.

2. In a corn-husking machine, the combination, with the husking-rollers, of an egg-shaped roller provided with a spiral flange journaled parallel therewith to rotate the corn, driving-gear therefor, and knuckle-joint connecting said roller and driving-gear, substantially as shown and described.

3. In a corn-husking machine, the combination, with the husking-rollers, of an egg-shaped roller, provided with a spiral flange journaled parallel therewith to rotate the corn, driving-gearing therefor, with knuckle-joint connecting said roller and driving-gear, and L-shaped plate resting on the frame and supporting said joint with set-screw to regulate same substantially as shown and described.

JOHN J. WOODMAN.

Witnesses:
GEO. S. DIAL,
HARRY R. ENOCH.